(12) United States Patent
Kissling et al.

(10) Patent No.: US 8,240,510 B2
(45) Date of Patent: Aug. 14, 2012

(54) MULTI-WAY VALVE DEVICE

(75) Inventors: Iwan Kissling, Bienne (CH); Jean-Luc Thuliez, Le Landeron (CH)

(73) Assignee: Nestec S.A., Vevey (CH)

( * ) Notice: Subject to any disclaimer, the term of this patent is extended or adjusted under 35 U.S.C. 154(b) by 664 days.

(21) Appl. No.: 12/438,875

(22) PCT Filed: Aug. 2, 2007

(86) PCT No.: PCT/EP2007/058010
§ 371 (c)(1),
(2), (4) Date: Feb. 25, 2009

(87) PCT Pub. No.: WO2008/025638
PCT Pub. Date: Mar. 6, 2008

(65) Prior Publication Data
US 2009/0320941 A1 Dec. 31, 2009

(30) Foreign Application Priority Data
Aug. 28, 2006 (EP) ...................................... 06405371

(51) Int. Cl.
*B67D 7/78* (2010.01)
(52) U.S. Cl. ........ 222/133; 222/309; 222/330; 222/340; 222/341; 222/361; 222/444; 222/559
(58) Field of Classification Search .................. 222/133, 222/309, 334, 389, 386.5, 333, 426, 444, 222/436, 440, 495–496, 504, 509, 559, 330, 222/340, 336, 361, 388, 341
See application file for complete search history.

(56) References Cited

U.S. PATENT DOCUMENTS

| | | | | |
|---|---|---|---|---|
| 3,168,213 A | * | 2/1965 | De Gon | 221/96 |
| 4,742,941 A | * | 5/1988 | Tastet | 222/309 |
| 4,974,754 A | * | 12/1990 | Wirz | 222/207 |
| 5,467,899 A | * | 11/1995 | Miller | 222/309 |
| 7,398,725 B2 | * | 7/2008 | Rebordosa et al. | 99/289 R |
| 7,464,838 B2 | * | 12/2008 | Mimura et al. | 222/389 |

FOREIGN PATENT DOCUMENTS

| | | |
|---|---|---|
| GB | 1294444 | 10/1972 |
| WO | WO 8912416 | 12/1989 |
| WO | WO 2005048791 | 6/2005 |

OTHER PUBLICATIONS

International Search Report for International Application No. PCT/EP2007/058010 mailed Sep. 20, 2007. Written Opinion for International Application No. PCT/EP2007/058010 mailed Sep. 20, 2007.

* cited by examiner

*Primary Examiner* — Frederick C. Nicolas
(74) *Attorney, Agent, or Firm* — K&L Gates LLP

(57) ABSTRACT

The invention relates to a multi-way valve device, particularly for household appliances, comprises a hollow body (11) and an axially movable piston (12) mounted inside this hollow body. The body (11) is provided with at least one inlet orifice (15) for a liquid solvent and at least two outlet orifices (16, 17) for this solvent. The movable piston (12) is coupled with an axially movable measuring stem (31) of a linear measuring element (30) of a solid substance, this measuring stem (31) being actuated by a mechanical actuator (32) and associated with a return spring (35). This movable piston (12) is arranged so as to move in one direction, freely, or against the pressure of the return spring (35), under the effect of the pressure of the liquid solvent applied at the inlet orifice (15) to this movable piston (12), and in the opposite direction, under the effect of the pressure applied to the measuring stem (31) by the return spring (35).

10 Claims, 7 Drawing Sheets

MULTI-WAY VALVE DEVICE

TECHNICAL FIELD

The present invention relates to a multi-way valve device having a hollow body and an axially movable piston mounted inside the said hollow body, this body comprising at least one inlet orifice for a liquid solvent and at least two outlet orifices for this solvent.

PRIOR ART

In many applications, both industrial and domestic, items of automated equipment are designed to prepare solutions based on solid substances, for example in the form of granules, powders, grains, aggregated particles or similar elements, and one or more solvents. For these preparations, it is usually necessary to measure, sometimes in weight, but more often in volume, the solid substances on the one hand, then to measure the appropriate solvent(s), on the other hand, also in weight or more usually in volumes and finally to convey them to a receptacle intended to receive the various components for the purpose of preparing a mixture.

In industrial production installations, the measuring elements of solid substances usually comprise a movable member actuated by a cylinder or by the plunger core of an electromagnet or by a linear or rotary drive motor or by any other known actuator. In this type of installation, the liquid solvents are usually transferred by pumping and their measurement is carried out by the regulation of the flow and the actuation of the pump for a predetermined period. The conveyance to the receptacle of one or more solvents or of one and the same solvent in different temperature or pressure conditions, is operated by independently-controlled multi-way valves. It is evident that, in these ponderous industrial installations, each of these items of equipment, solid component measuring element, liquid solvent pump and multi-way valves, comprises its own motorized activation system. Looking for a reduced cost and space requirement is not usually the major concern of the designers. Efficiency, productivity and reliability are sought as a priority.

On the other hand, in domestic appliances, particularly consumer appliances, for example household appliances, the manufacturing cost of multifunctional items of equipment is the primary concern of the manufacturers. When an item of equipment must be capable of measuring solid substances, measuring liquids and conveying these liquids through a valve with several ways, it is necessary to have mechanized actuators that are capable of setting in motion different movable members belonging respectively to the components assuming the said functions. These actuators are relatively costly and considerably increase the cost of the said items of equipment if they are independent. Pumps for conveying the liquid solvents are inevitably provided with an electric motor. Measuring elements of solid substances often comprise a linear actuator with a plunger core attracted inside a solenoid when an electric voltage is applied to its terminals. Multi-way valves usually comprise a solenoid that moves a piston in one direction or in the opposite direction. The latter element is particularly costly and substantially increases the total price of a multifunctional item of equipment, complicates its assembly and increases its space requirement.

In addition, the preparation of solutions by dissolving solid substances such as granules, powders or grains, may require a particular sequencing of the introduction of the solid and the solvent in different steps or the sequenced use of solvents of different types. This is particularly the case in the field of preparing drinks based on dehydrated powders: a first quantity of solvent may be mixed with the powder in a first time, then subsequently a second quantity of solvent may be inserted into the first mixture in order to produce a texture effect, for example foam, and complete the dilution.

DESCRIPTION OF THE INVENTION

The present invention proposes to alleviate these disadvantages by producing a multi-way valve device, for delivering a solvent in a predetermined state of temperature and pressure, combined with a device for measuring a soluble product into this solvent, the said multi-way valve device being reliable, economic to construct and use and easy to make and maintain.

This object is achieved by a multi-way valve device having a hollow body and an axially movable piston mounted inside the said hollow body, this body comprising at least one orifice for the inlet of a liquid solvent and at least two outlet orifices for this solvent, characterized in that the said movable piston is coupled with an axial movement measuring stem of a linear measuring element of a solid substance consisting of particles divided particularly into grains, granules, powder or similar particles, this measuring stem being actuated by a mechanical actuator and associated with a return spring, and in that the said movable piston is arranged so as to move in one direction, freely, or against the pressure of the said return spring, under the effect of the pressure of the said liquid solvent applied at the said inlet orifice to this movable piston, and in the opposite direction, under the effect of the pressure applied to the said measuring stem by the return spring.

According to the invention, the inlet orifice and the two outlet orifices are usually all separate. The movement of the measuring stem is controlled both by the movable piston and by the mechanical actuator because these two movement means are separate.

In a preferred embodiment of the device, in which the said movable piston comprises a piston head and a piston stem, the said piston head is provided with at least one internal channel arranged in order to bring into communication at least one of the said inlet orifices and at least one of the said outlet orifices for a determined position of the said mobile piston.

In another embodiment, in which the said movable piston comprises a piston head and a piston stem, the said piston head comprises a first internal channel arranged to bring into communication a first inlet orifice and at least one of the said outlet orifices, for a determined position of the said movable piston, and a second internal channel arranged to bring into communication at least one second inlet orifice and at least one of the said outlet orifices for another determined position of the said movable piston.

In a particularly advantageous manner, the said measuring stem is arranged in order to slide in a hollow sheath which supports at least one reservoir for the storage of the said solid substance having an outlet opening emerging into the said sheath, this measuring stem comprising at least one peripheral groove arranged in order to receive a single measure of the said solid substance when the said measuring stem is moved so as to position this peripheral groove opposite the said outlet opening of the storage reservoir.

Preferably, the said sheath comprises at least one through-opening arranged in order to allow a gas to pass through, when the said measuring stem is in a determined position.

In order to ensure a precise measure of the solid substance, the said measuring stem may comprise at least two axially offset peripheral grooves, the distance that separates the two peripheral grooves being substantially equal to the distance that separates the said outlet opening of the storage reservoir and the said through-opening of the said sheath.

Advantageously, the said measuring stem is coupled to a plunger core of the mechanical actuator and comprises a bearing collar for the said return spring.

The hollow body is preferably closed, at one of its ends, by a closure end-piece, and the length of the piston head is such that the said first channel emerges into the second outlet orifice when the said piston head is pressing against the said closure end-piece.

According to another embodiment, the length of the piston head may be such that the said second channel emerges into the second outlet orifice when the said piston head is pressing against the said closure end-piece.

Advantageously, the movable piston, the measuring stem and the plunger core are placed coaxially.

In a particularly advantageous manner, the measuring stem and the plunger core are made in one piece.

BRIEF DESCRIPTION OF THE DRAWINGS

The present invention and its advantages will be better understood on reading the detailed description of preferred embodiments of the device of the invention, with reference to the appended drawings given as an indication and non-limitingly, in which.

BETTER WAYS OF EMBODYING THE INVENTION

Figure 1:
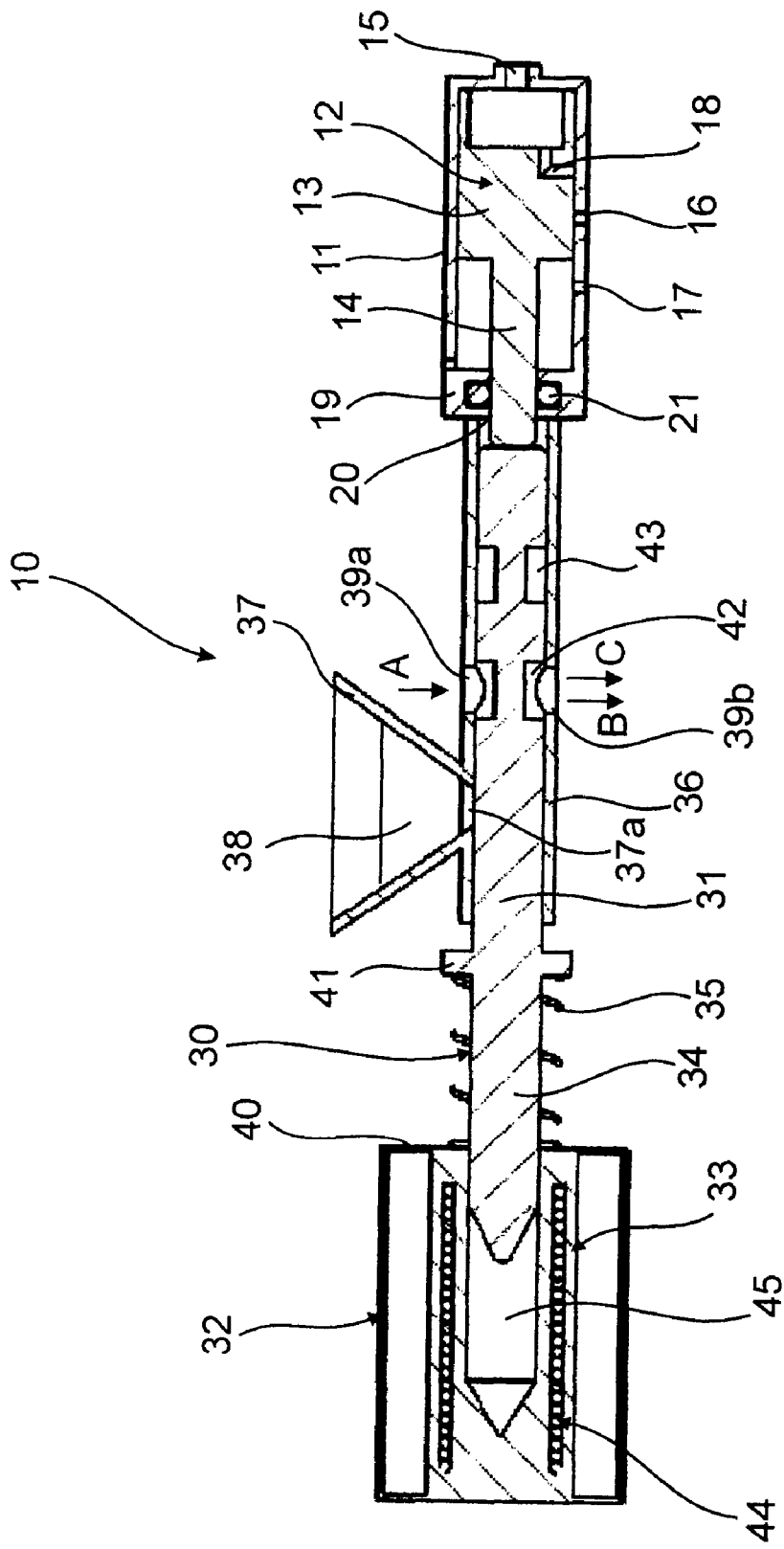
FIG. 1 is a schematic view in section representing a first embodiment of the device of the invention in a first state of operation.

With reference to FIG. 1, the multi-way valve device 10, as shown, comprises a hollow body 11, preferably of cylindrical shape in which a movable piston 12 comprising a piston head 13 and a piston stem 14 attached to the piston head 13 can slide axially. In this exemplary embodiment, the hollow body 11 is provided with an inlet orifice 15 arranged at one axial end of this body and two outlet orifices, respectively 16 and 17, arranged in the side wall of the body 11. The said piston head 13 is fitted with an internal channel 18, whose role will appear in greater detail during the description, this channel being arranged in order to make the said inlet orifice 15 communicate with one or the other outlet orifice 16 or 17 depending on the position of the piston 12. The hollow body also comprises a closure end-piece 19 provided with a central opening 20 for the piston stem 14 to pass through during its axial movement. An O-ring 21 provides the seal between the central opening 20 and the piston stem 14.

The valve device 10 also comprises a linear measuring element 30 comprising an axially movable measuring stem 31 coupled with a mechanical actuator 32 preferably comprising an electromagnet 33 acting on a plunger core 34 connected to the said measuring stem 31, and a return spring 35. The measuring stem 31 is partially housed in a sheath 36 in which it slides when it is acted upon, particularly by the mechanical actuator 32 or by other components of the device, as will be described in greater detail below. A storage reservoir, in the form of a hopper 37 is mounted on the sheath 36 in order to contain a solid substance 32 which may have the form of divided particles, particularly grains, aggregated granules, powder or similar particles. This hopper 37 comprises an outlet opening 37a for the solid substance 38 contained in the hopper 37, which emerges into the sleeve 36, this outlet opening 37a making it possible to make the inside of the hopper 37 communicate with the inside of the sheath 36. The sheath 36 furthermore comprises a through-opening comprising in fact two openings, respectively top 39a and bottom 39b, that are placed opposite one another in order to allow either the passage of air, or the passage of the solid substance 38 or the simultaneous passage of air and the solid substance 38, as will be described below. The distance between the outlet opening 37a and the through-opening 39a, 39b is determined precisely according to the geometry of certain portions of the measuring stem.

The return spring 35 is, in the example shown, a coil spring that is mounted coaxially on the plunger core 34 and that presses, on the one hand, on a transverse side 40 of the mechanical actuator 32 and, on the other hand, on a protuberant bearing collar 41, placed radially relative to the said plunger core 31 or to the said measuring stem 31. This measuring stem 31 is advantageously made in one piece with the said plunger core 34 and placed in the axial extension of the latter.

The measuring stem 31 comprises two axially offset peripheral grooves, respectively 42 and 43, whose role will be explained below. For reasons that will clearly appear in the following description, the distance between the two peripheral grooves 42 and 43 is substantially equal to the distance that separates the outlet opening 37a of the hopper 37 from the through-opening 39a, 39b of the sheath 36.

The mechanical actuator 32 with the plunger core 34 is of the known type and its electromagnet 33 comprises at least one solenoid 44 connected to a source of electric energy (not shown) arranged in order to create a magnetic field so as to cause the plunger core 34 to move axially inside its central housing 45. This movement has the effect of operating the measuring stem 31 and of compressing the return spring 35.

The various operating sequences of this embodiment of the device of the invention will be described below in detail with reference to FIGS. 1 to 4.

FIG. 1 shows the device in its initial phase. No pressure is applied by the solvent (not shown) at the inlet orifice 15 on the movable piston 12 which is pressing against the end of the hollow body 11. The solenoid 44 of the mechanical actuator 32 is not supplied, so that the plunger core 34 is not attracted inside its housing 45 and the measuring stem 31 is not subjected to the pressure force of the return spring 35 which presses it against the end of the piston stem 14 of the piston 12. In this position, the hopper 37 is closed and no solid substance 38 can be discharged via its bottom opening 37a. The outlet orifices 16 and 17 are closed off so that no liquid solvent can flow therefrom. However, the peripheral groove 42 is placed opposite the through-opening 39a, 39b arranged in the sheath 36, so that a measure of solid substance 38, that has been previously drawn off from the content of the hopper 37 may flow freely into a receiving receptacle (not shown). The phase for preparing the single dose of solid substance will be described with reference to FIG. 3. The top opening 39a communicates with the open air or with pressurized air or gas conveyed via a duct (not shown) as indicated by the arrow A. This air or this gas passes through the peripheral groove 42 initially containing a single measure of solid substance 38 and is discharged through the bottom opening 39b as shown by the arrow B. The solid substance of the single measure contained in the peripheral groove 42 is also discharged via the bottom opening 39b, as shown by the arrow C.

Figure 2:
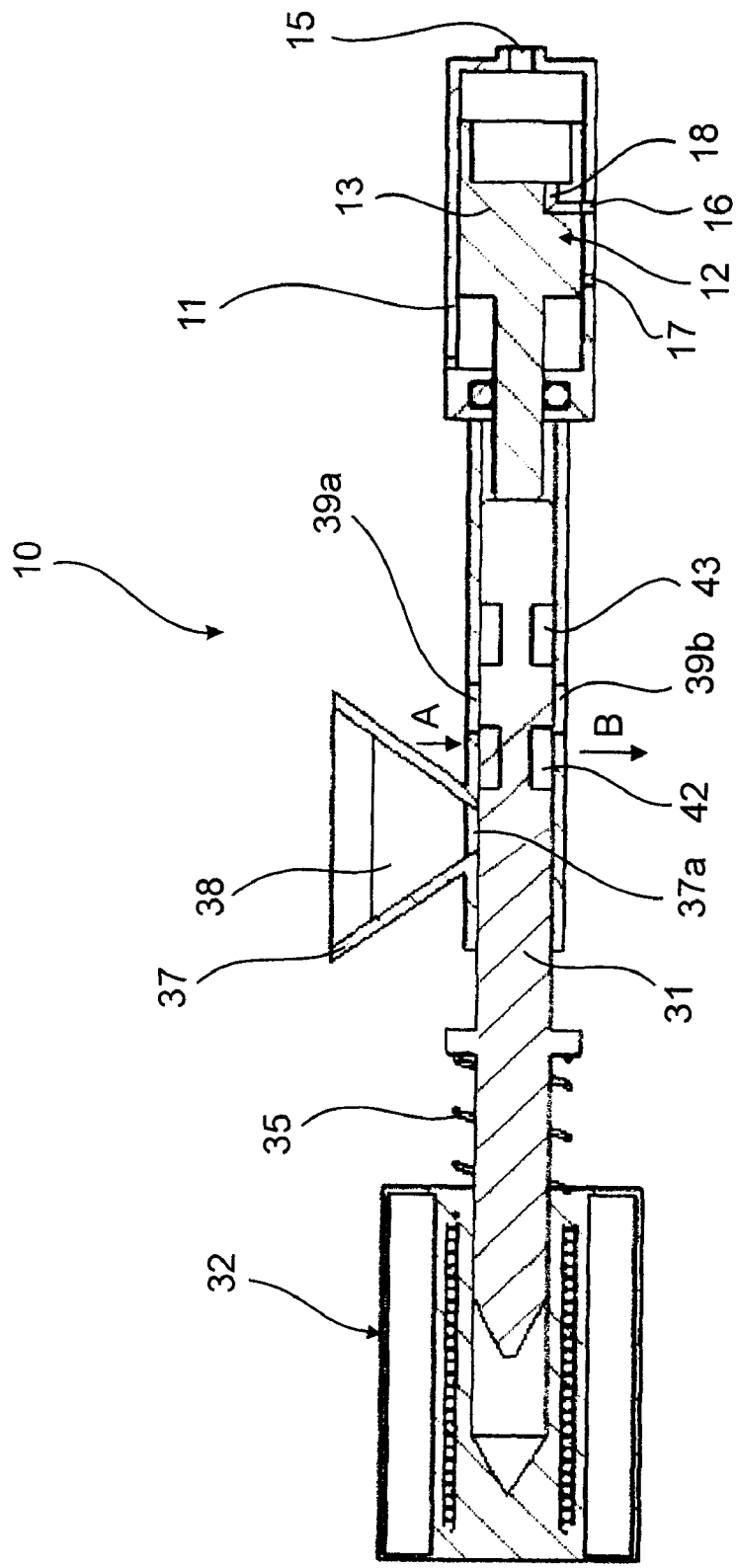
FIG. 2 is a schematic view in section representing the first embodiment of the device of the invention in a second state of operation.

FIG. 2 shows the device in a first operating phase. The solvent that is brought to the inlet orifice 15 via a conventional duct (not shown) applies a determined pressure at this inlet orifice 15 which results in a pushing force on the piston 12. This force is opposed to that exerted by the return spring 35 via the measuring stem 31 and has the effect of pushing the piston so that the channel 18 is positioned opposite the outlet orifice 16, which places the source of solvent (not shown) in communication with a receiving receptacle (not shown) into which the solvent originating from the outlet orifice 16 flows at a given pressure and temperature. The desired temperature may be obtained by conventional heating or cooling means (not shown) upstream of the inlet orifice 15. The pressure is generated by a conventional supply pump (not shown) placed between the source of solvent and the inlet orifice 15. In this state, the device 10 delivers solvent in the desired temperature and pressure conditions. On the other hand, the measuring element 30 remains inoperative since the measuring stem 31, although it has been partially pushed, has not moved sufficiently for the peripheral groove 42 to be brought under the outlet opening of the hopper 37. Note nevertheless that air can pass into this groove as shown by the arrows A and B, which also corresponds to the state illustrated by FIG. 1.

Figure 3:
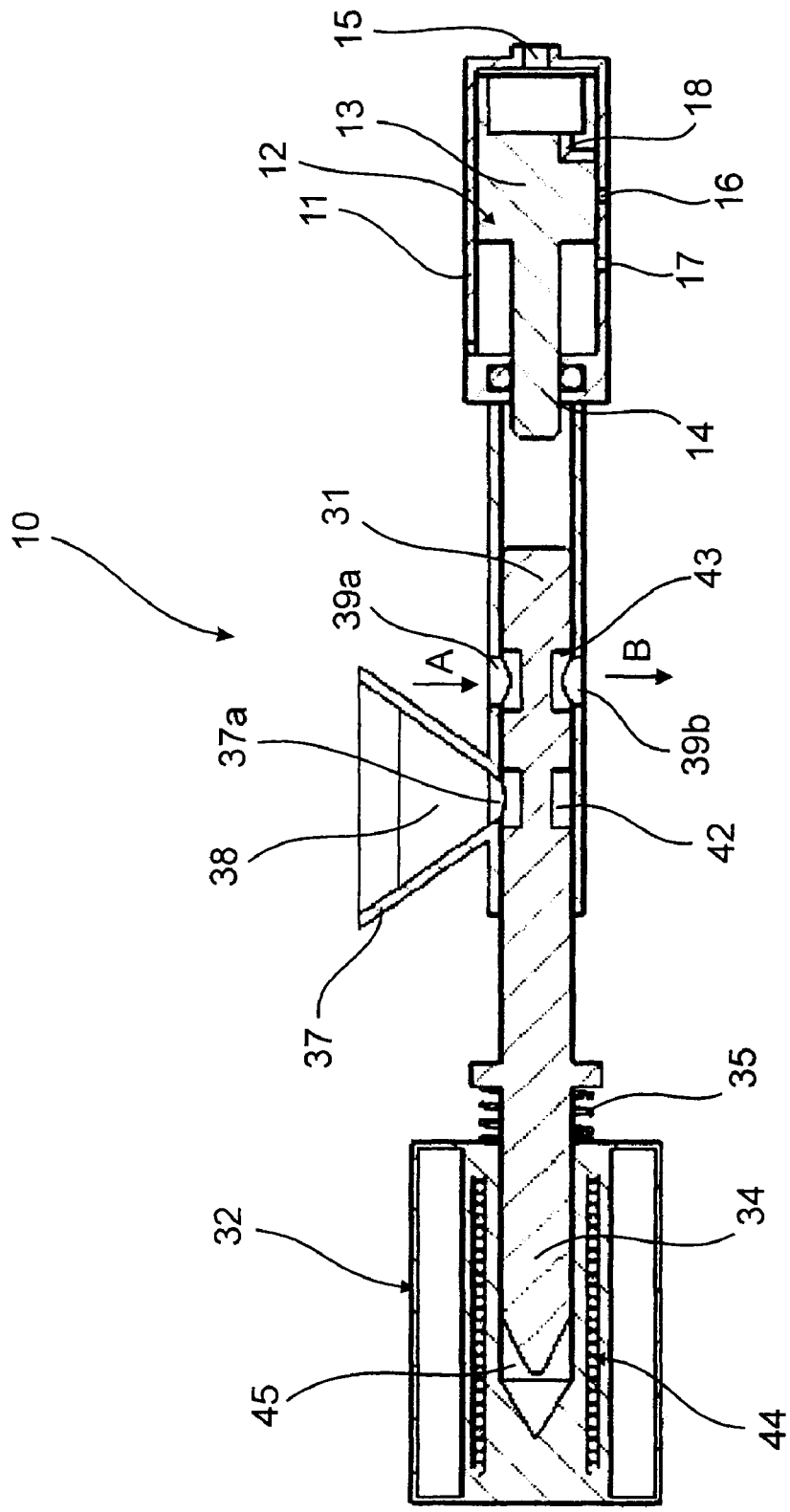
FIG. 3 is a schematic view in section representing the first embodiment of the device of the invention in a third state of operation.

FIG. 3 corresponds to a third state of the device in which the solid substance 38 is measured. In a first time, the pressure of the solvent is relaxed at the inlet orifice 15, which generates an axial pressure of the return spring 35 which, by means of the measuring stem 31, on the piston stem 14 so that the head of the piston 13 is pushed to the abutment, closes off the inlet orifice 15 and closes the outlet orifice 16. In a second time, the solenoid 44 is supplied with electric power and activates the plunger core 34 by attracting it into its housing 45. It compresses the return spring 35 which accumulates mechanical energy capable of being released in the sequence described with reference to FIG. 1. It draws the measuring stem 31 so that the peripheral groove 42 is positioned under the outlet opening 37a of the hopper 37 and is filled with solid substance 38. This groove defines a cavity which corresponds to a volume of substance to be measured, that is to say a single measure of this substance. At the end of this sequence, the measure is drawn off, but it remains confined in the peripheral groove 42. The air or the gas continues to pass through the openings 39a and 39b of the through-opening of the sheath 36, as shown by the arrows A and B.

Figure 4:
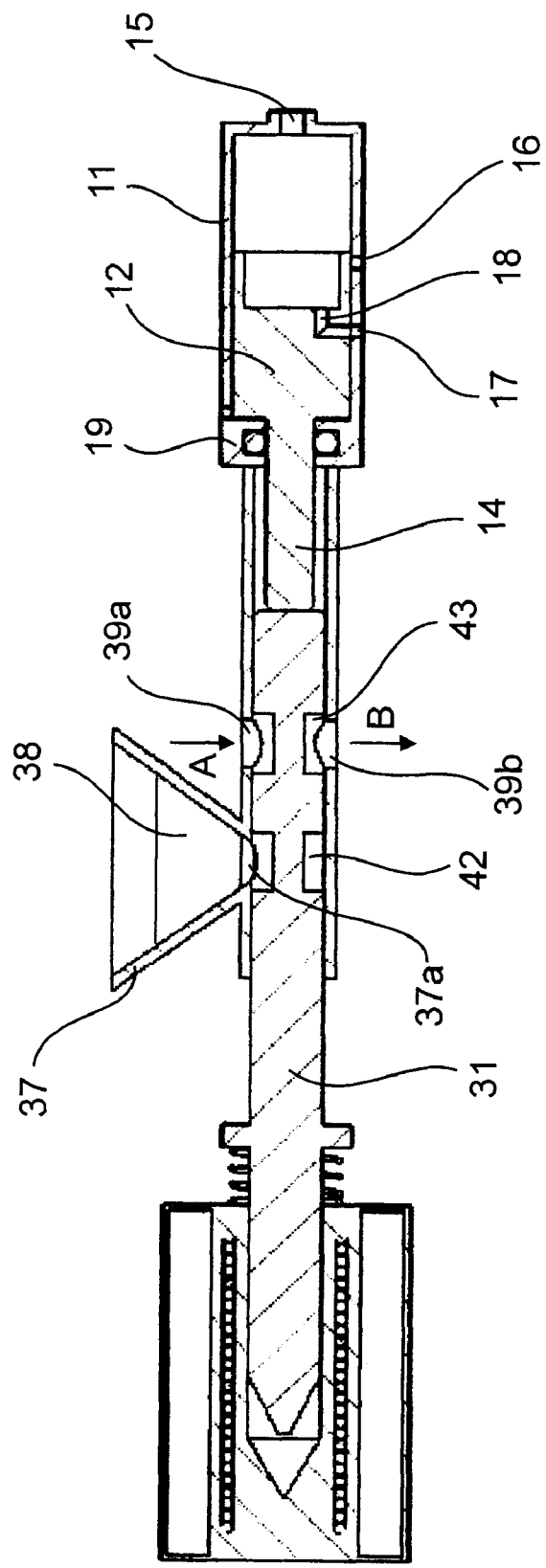
FIG. 4 is a schematic view in section representing the first embodiment of the device of the invention in a fourth state of operation.

FIG. 4 corresponds to a fourth state of the device in which the solvent is injected, under determined temperature and/or pressure conditions, into the solution prepared during the preceding phases by the addition of solvent originating from the outlet orifice 16 at a dose of substance drawn off by means of the measuring stem 31 and discharged via the bottom opening 39b arranged in the sheath 36, all of it being brought by conventional means into a receptacle (not shown). During this phase, the measuring stem 31 remains in the position of the preceding phase shown by FIG. 3. On the other hand, the solvent applies a pressure on the inlet orifice 15 which has the effect of pushing the piston 12 to abutment against the closure end-piece 19, the end of the piston stem 14 coming to abutment against the end placed opposite to the measuring stem 31. In this position, the channel 18 places the inlet orifice 15 in communication with the second outlet orifice 17, the first outlet orifice 16 being closed off. The pressure of the solvent may, for example, be higher and the outlet may, for example, have a smaller section in order to generate a jet intended to carry out a stirring of the mixture for the purpose of ensuring a better homogeneity of this mixture. The air or a pressurized gas continues to pass through the through-opening 39a, 39b.

Figure 5:
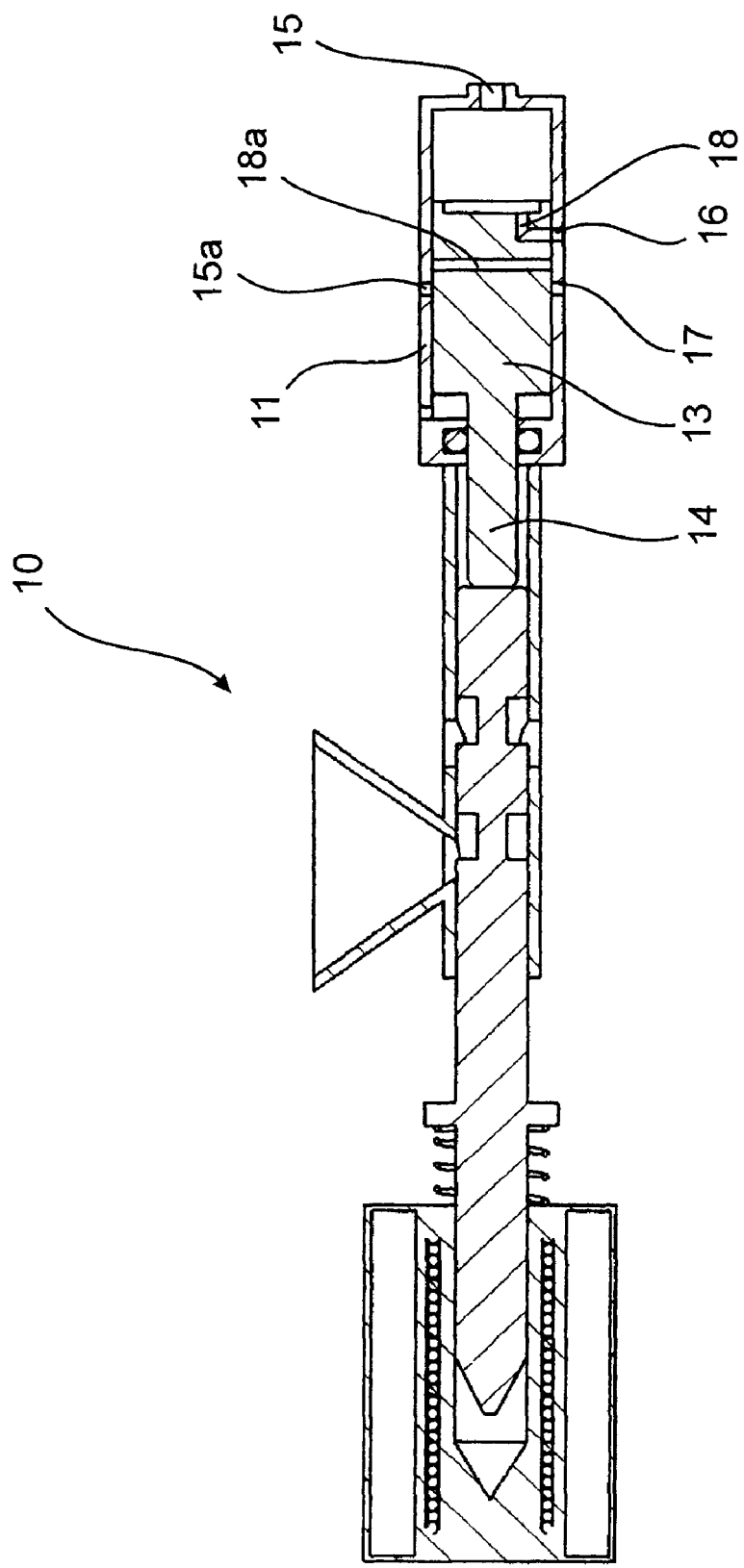
FIG. 5 is a schematic view in section representing a second embodiment of the device of the invention in a first state of operation.
Figure 6:
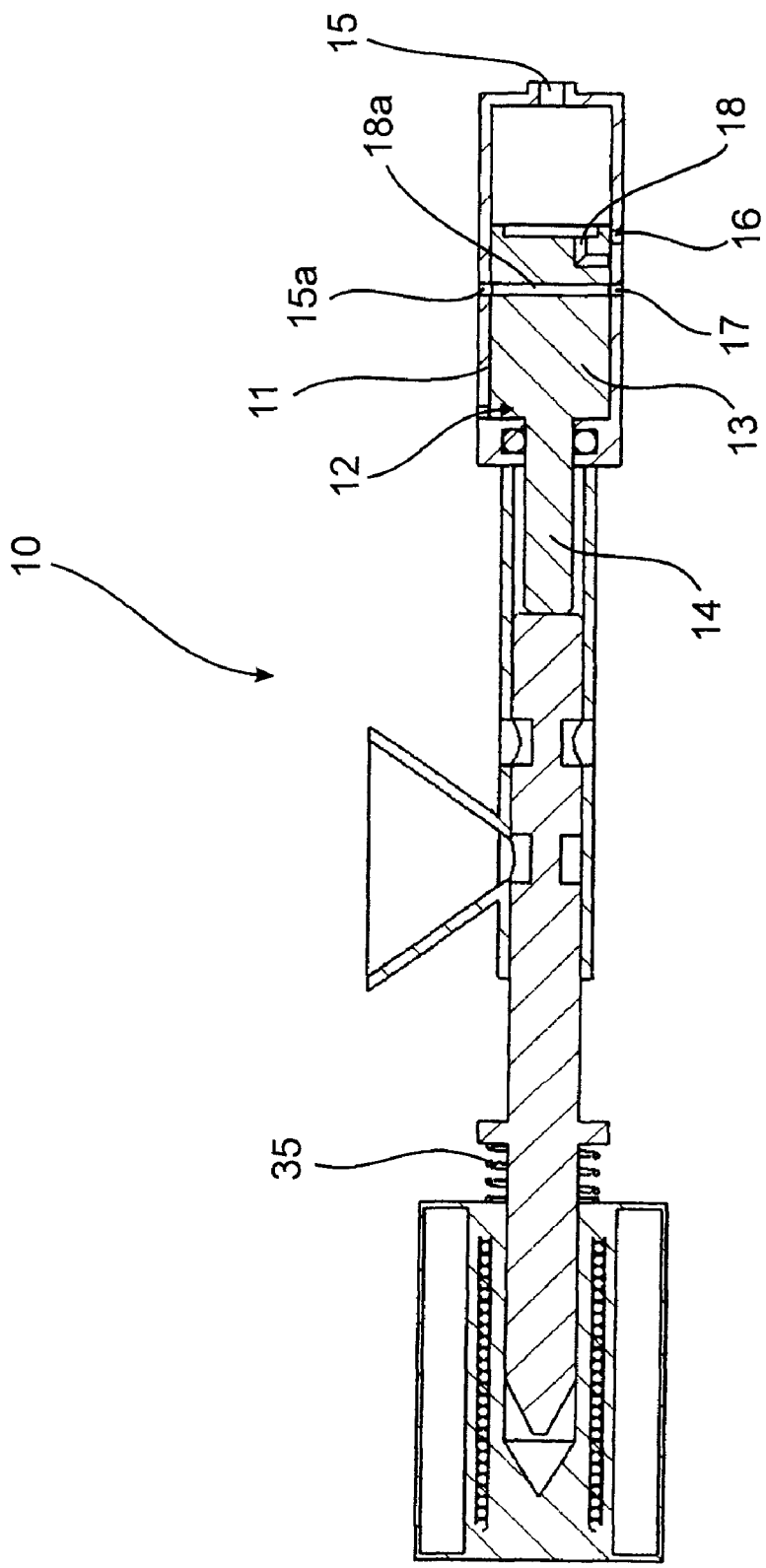
FIG. 6 is a schematic view in section representing the second embodiment of the device of the invention in a second state of operation.

With reference to FIGS. 5 and 6, the multi-way valve device 10 as shown comprises, as previously, a hollow body 11, preferably of cylindrical shape, in which a piston 12 comprising a piston head 13 and a piston stem 14 attached to the piston head 13 can slide axially. The shape and the functions of these components are substantially the same as those of the example described above. However, in this embodiment, the said piston head 13 is fitted with a first channel 18, substantially identical to that of FIGS. 1 to 4 and a second through-channel 18a whose function will be explained below. Although the first bottom channel 18 is designed to be connected to a first source of solvent connected to a first inlet orifice 15, and can deliver this solvent under different temperature and pressure conditions to the two outlet orifices 16 and 17, the second through-channel 18a is designed to be connected to a second source of solvent connected to a second inlet orifice 15a and can deliver a second solvent to the outlet orifice 17. Accordingly, it will be noted that, in the embodiment shown, the second inlet orifice 15a is opposite to the second outlet orifice 17, because the second channel 18a is rectilinear. It is evident that the two orifices 15a and 17 could be positioned differently if the channel 18a had another profile. This embodiment makes it possible to adapt the device to wider applications since it allows, in a very simple manner, the use of two different solvents.

FIG. 5 corresponds to the state represented by FIG. 2 in which the inlet orifice 15 is in communication with the outlet orifice 16. In this embodiment, the first solvent may be brought into the receptacle (not shown) of the mixture.

FIG. 6 corresponds to a next sequence, in which the pressure of the first solvent at the inlet orifice 15 has been increased so as to exert an additional force on the piston 12 that is pushed, further compressing the return spring 35, to a position in which the second through-channel 18a connects the inlet orifice 15a and the outlet orifice 17. The second solvent may then be delivered.

The other operating phases are substantially identical to those described with reference to FIGS. 1 to 4.

Figure 7:
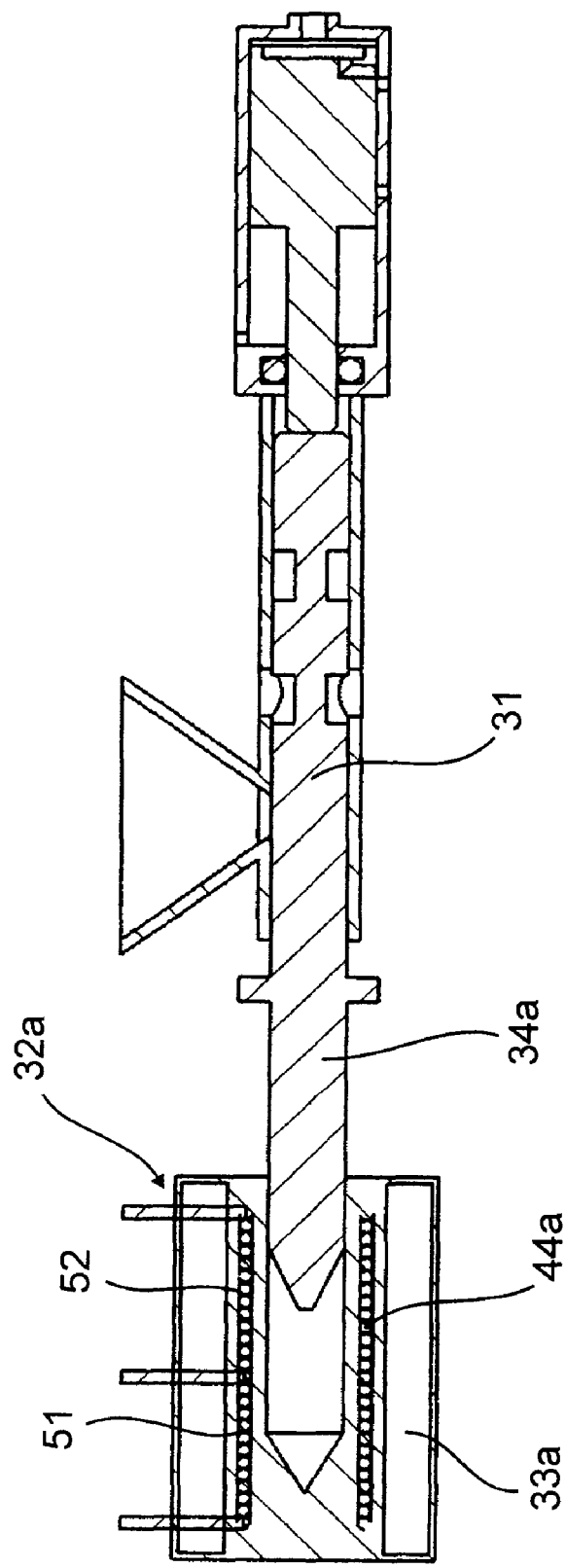
FIG. 7 is a schematic view in section representing a variant embodiment of the device of the invention.

FIG. 7 represents a variant in which the solenoid 44a of the electromagnet 33a of the mechanical actuator 32a with a plunger core 34a is produced according to a different construction from that of the solenoid 44 represented by FIGS. 1 to 6. In this exemplary embodiment, the solenoid consists of two coils 51 and 52 which may be supplied independently or simultaneously. This construction makes it possible to modulate the movement of the plunger core 34a and consequently of the measuring stem 31 which is attached to it. The amplitude of the movements may be varied and the force applied according to the applications of the device.

It will be noted that the number of inlet orifices, the number of outlet orifices and the number of channels, preferably arranged inside the movable piston head, are not limited. If certain applications require the use of several solvents, the number of inlets may be adapted in consequence, as may the number of outlets which also depends on parameters, for example, of temperature and pressure of the solvents to which the solid substance or substances will be added. Also, with reference to the solid substances, the hopper could be replaced by several hoppers containing different substances or the same substance in different states. In this case, it is evident that the measuring stem should be adapted in consequence and that the number of peripheral grooves should, as appropriate, be increased.

All these modifications do not depart from the field of the present invention, because they apply the basic principle which consists in reducing the number of actuating mechanisms making it possible to produce the mixture or mixtures, the forces used being reduced to those generated by the pressure applied by a solvent on the surface of the piston head and that exerted by a return spring placed in compression by a mechanical actuator with an electromagnet.

POSSIBILITIES OF INDUSTRIAL APPLICATION

The device described above finds many applications in appliances that automatically make a mixture of a solid substance having the shape of particles divided into granules, into powder, into the form of various aggregated and similar elements and of at least one solvent that can be water, or any other appropriate substance. These appliances may be of the domestic type, such as, for example, machines making it possible to prepare drinks, or preparations for domestic work, such as paints, cleaning solutions based on dry granules and solvents or mixtures of appropriate solvents. These appliances may also be of the industrial type and the device described may be incorporated into an installation in which its function consists in managing a process of preparing a solution of various products.

The invention claimed is:

1. A multi-way valve device having a hollow body and an axially movable piston mounted inside the hollow body, the hollow body comprising at least one orifice for the inlet of a liquid solvent and at least two outlet orifices for the solvent, the movable piston is coupled with an axial movement measuring stem of a linear measuring element of a solid substance comprising particles selected from the group consisting of grains, granules, and powder, the measuring stem being actuated by a mechanical actuator and associated with a return spring, and in that the movable piston is designed to move in one direction, freely, or against the pressure of the return spring, under an effect of a pressure of the liquid solvent applied at the inlet orifice to the movable piston, and in an opposite direction, under an effect of a pressure applied to the measuring stem by the return spring, wherein the movable piston comprises a piston head and a piston stem, the piston head comprises at least one internal channel so constructed and arranged to bring into communication at least one inlet orifice and at least one of the outlet orifices for a determined position of the movable piston.

2. The valve device of claim 1, wherein the hollow body is closed, at one of its ends, by a closure end-piece, the length of the piston head is such that the first channel emerges into the second outlet orifice when the piston head is pressing against the closure end-piece.

3. A multi-way valve device having a hollow body and an axially movable piston mounted inside the hollow body, the hollow body comprising at least one orifice for the inlet of a liquid solvent and at least two outlet orifices for the solvent, the movable piston is coupled with an axial movement measuring stem of a linear measuring element of a solid substance comprising particles selected from the group consisting of grains, granules, and powder, the measuring stem being actuated by a mechanical actuator and associated with a return spring, and in that the movable piston is designed to move in one direction, freely, or against the pressure of the return spring, under an effect of a pressure of the liquid solvent applied at the inlet orifice to the movable piston, and in an opposite direction, under an effect of a pressure applied to the measuring stem by the return spring, wherein the movable piston comprises a piston head and a piston stem, the piston head comprises a first internal channel so constructed and arranged to bring into communication a first inlet orifice and at least one of the outlet orifices for a determined position of the movable piston, and a second internal channel so constructed and arranged to bring into communication at least a second inlet orifice and at least one of the outlet orifices for another determined position of the movable piston.

4. The valve device of claim 3, wherein the hollow body is closed, at one of its ends, by a closure end-piece, the length of the piston head is such that the second channel emerges into the second outlet orifice when the piston head is pressing against the closure end-piece.

5. A multi-way valve device having a hollow body and an axially movable piston mounted inside the hollow body, the hollow body comprising at least one orifice for the inlet of a liquid solvent and at least two outlet orifices for the solvent, the movable piston is coupled with an axial movement measuring stem of a linear measuring element of a solid substance comprising particles selected from the group consisting of grains, granules, and powder, the measuring stem being actuated by a mechanical actuator and associated with a return spring, and in that the movable piston is designed to move in one direction, freely, or against the pressure of the return spring, under an effect of a pressure of the liquid solvent applied at the inlet orifice to the movable piston, and in an opposite direction, under an effect of a pressure applied to the measuring stem by the return spring, wherein the measuring stem is so constructed and arranged to slide in a hollow sheath which supports at least one reservoir for the storage of the solid substance having an outlet opening emerging into the sheath, the measuring stem comprising at least one peripheral groove so constructed and arranged to receive a single measure of the solid substance when the measuring stem is moved so as to position the peripheral groove opposite the outlet opening, and wherein the sheath comprises at least one through-opening so constructed and arranged to allow a gas to pass through, when the measuring stem is in a determined position.

6. The valve device of claim 5, wherein the measuring stem comprises at least two axially offset peripheral grooves, a distance that separates the two peripheral grooves being substantially equal to a distance that separates the said outlet opening of the storage reservoir and the through-opening of the sheath.

7. A multi-way valve device having a hollow body and an axially movable piston mounted inside the hollow body, the hollow body comprising at least one orifice for the inlet of a liquid solvent and at least two outlet orifices for the solvent, the movable piston is coupled with an axial movement measuring stem of a linear measuring element of a solid substance comprising particles selected from the group consisting of grains, granules, and powder, the measuring stem being actuated by a mechanical actuator and associated with a return spring, and in that the movable piston is designed to move in one direction, freely, or against the pressure of the return spring, under an effect of a pressure of the liquid solvent applied at the inlet orifice to the movable piston, and in an opposite direction, under an effect of a pressure applied to the measuring stem by the return spring, wherein the measuring stem is coupled to a plunger core of the mechanical actuator and comprises a bearing collar for the return spring.

8. The valve device of claim 7, wherein the movable piston, the measuring stem and the plunger core are placed coaxially.

9. The valve device of claim 8, wherein the measuring stem and the plunger core are integral.

10. A multi-way valve device having a hollow body and an axially movable piston mounted inside the hollow body, the body comprising at least one orifice for the inlet of a liquid solvent and at least two outlet orifices, the movable piston is coupled with an axial movement measuring stem of a linear measuring element of a solid substance consisting of particles, the measuring stem being actuated by a mechanical actuator and associated with a return spring and the movable piston can move in one direction, under an effect of a pressure of the liquid solvent, and in an opposite direction, due to the return spring, wherein the measuring stem comprises at least two axially offset peripheral grooves, a distance that separates the two peripheral grooves being substantially equal to a distance that separates an outlet opening of a storage reservoir and a through-opening of a sheath.

* * * * *